United States Patent Office 3,225,128
Patented Dec. 21, 1965

3,225,128
METHOD OF FORMING POLYVINYL
ALCOHOL FILM
Hideo Suzumura, Katsuaki Hirano, and Saburo Kawamura, Okayama-ken, and Koichi Nagano, Osaka-fu, Japan, assignors to Kurashiki Rayon Co., Ltd., Okayama Prefecture, Japan, a corporation of Japan
No Drawing. Filed Jan. 31, 1963, Ser. No. 255,217
Claims priority, application Japan, Aug. 12, 1958, 33/22,737
2 Claims. (Cl. 264—216)

This application is a continuation-in-part of our copending application Serial Number 833,147, filed August 12, 1959, now abandoned.

This invention relates to a method for the production of a polyvinyl alcohol film by a continuous process, and it is especially concerned with the use in polyvinyl alcohol film formation of a metal film-casting surface in a film-forming machine which is coated with a mixed resin to give a surface coating having properties suitable for the production of a polyvinyl alcohol film thereon.

Polyvinyl alcohol film can be formed by pouring or otherwise applying an aqueous solution of polyvinyl alcohol onto a surface such as that of a body of mercury or that of a sheet of glass. For industrial production, however, the polyvinyl alcohol solution is poured or otherwise applied onto the casting surface of a film-forming machine which comprises, for example, a heated metal rotary endless belt of metallic cylinder, which is usually chromium plated. Film forming machinery of this type is well-known. Methods have been developed for substituting a thermosetting resin film for the chromium plating on the metallic surface of such a film-forming machine. However, when the polyvinyl alcohol film is formed on a metal surface which has been coated and baked with any of the known resins, although the film surface is sufficiently smooth and the polyvinyl alcohol film may be stripped off satisfactorily from the resin surface, the adhesion of the resin coating to the metal surface is unsatisfactory. Moreover, the resin coating usually forms blisters after it has been used for a relatively short time, making it unusable unless the surface is repaired or re-coated. This makes it impossible to use a machine with such a resin coating in a continuous process for the industrial production of polyvinyl alcohol film.

Since production of a polyvinyl alcohol film on an industrial scale by pouring or otherwise applying an aqueous solution of polyvinyl alcohol onto a surface, such as a resin-coated metal, requires drying of the film at a relatively high temperature, it is necessary that the resin coating be heat resistant and hot-water resistant. The heat and hot-water resistance of a resin varies with its degree of condensation or polymerization. A resin with an inadequate degree of condensation or polymerization will show a drop in heat and hot-water resistance, thus giving an unsatisfactory durability to the resin coating formed from it.

A principal object of this invention is to provide a method for the production of a polyvinyl alcohol film by a continuous process.

Another object of this invention is to provide a method for producing polyvinyl alcohol film which utilizes a metal film-casting surface coated with a mixed resin coating in a film-forming machine of the type employed in the industrial production of polyvinyl alcohol film.

Other objects and advantages of the invention will be apparent from a consideration of the specification and claims.

In accordance with the invention, we prepare a coated metal surface and we employ this surface for the continuous manufacture of polyvinyl alcohol film on an industrial scale in a film-forming machine, using for the coating a mixture of polyvinyl butyral and phenol-formaldehyde resins. The coating not only gives a smooth surface and possesses the property that the polyvinyl alcohol film can be easily stripped from the surface, but the resin also has good adhesion to the applied metal surface, good heat and hot-water resistance, and durability.

The phenol-formaldehyde resin for use in this invention is prepared by condensing carbolic acid and formalin, e.g. in the molecular ratio of about 1 to 1.2, using aqueous ammonia as a catalyst and a temperature of about 95° C., until an initial emulsified state is observed. The initial condensation product is then separated, rinsed, and slowly heated to about 130° C. so as to evaporate the water and thus concentrate the resin. The condensation reaction is then suspended by quenching.

The phenol-formaldehyde resin thus prepared is mixed with a polyvinyl butyral resin having a degree of polymerization of between 800 and 1200, and a degree of acetalization of 60% or more, calculated on the total amount of initial hydroxyl groups. The phenol-formaldehyde resin comprises 20% by weight or more of the resin mixture. The polyvinyl butyral is prepared by the acetalization of polyvinyl alcohol with butyraldehyde in accordance with known procedures. The mixed resin is then dissolved in a suitable solvent, such as a mixture of about 6 parts of acetone and 4 parts of methanol. The resin solution is then coated and dried on the metal surface, and the surface film is heat-treated for 1 to 15 hours at 100° C. to 200° C.

The following example is given to illustrate our invention, but is not intended to limit the invention in any way. All parts are by weight unless otherwise indicated.

*Example 1*

Carbolic acid and formalin in the molecular ratio of 1 to 1.2 were placed into a reaction tank provided with a reflux condenser and an agitator. Ten percent ammonia water was added as catalyzer in the proportion of 30 parts of ammonia water for each 100 parts of carbolic acid. The reaction was continued at a temperature of 95° C. until an initial emulsion was generated. This required about 20 minutes. The condensation product was separated, then washed four times with water having a temperature of 80° C. The water was then evaporated off so as to concentrate the resin. During the concentration process the condensation reaction continued, the temperature rising at the rate of about 0.5° C. per minute, starting from 100° C., until it reached 130° C. The product was then poured directly on a metal plate to quench and to stop the condensation reaction. The phenol-formaldehyde resin thus produced was ground into powder using a crusher.

Seven parts of the phenol-formaldehyde resin prepared as above was mixed with three parts of a polyvinyl butyral resin having an average degree of polymerization of about 1200 and a degree of acetalization corresponding to about 70% of the hydroxyl groups in the polyvinyl alcohol. A mixed solvent was prepared from 6 parts of acetone and 4 parts of methanol. The mixed resin was then dissolved in the mixed solvent to form an 8% solution of the resin.

The resin solution prepared as above was thereafter coated on the surface of a rotating film-making machine of the iron cylinder type. In starting the coating process, the surface of the film-making machine was kept at 30° C. The temperature was then increased gradually as the coating process advanced, up to the final temperature of 50° C. The coating was effected in 20 consecutive revolutions. After being coated, the film-making machine was kept rotating, during which time the temperature was gradually increased further up to 60° C. in four hours, so as to finish the drying process.

After the drying process, the surface temperature of the film-making machine was allowed to rise to 140° C. in one hour, and this heat treatment was continued for 15 hours. The resulting coating had a smooth surface, good heat and hot water resistance, durability and good adhesion to the coated metal surface. A polyvinyl alcohol film formed on this resin-coated surface could be readily stripped off.

What we claim is:

1. The method of forming a film of polyvinyl alcohol from an aqueous polyvinyl alcohol solution which comprises depositing said solution upon a rotatable film-casting surface coated with a coating consisting essentially of a phenol-formaldehyde resin and a polyvinyl butyral resin having a degree of polymerization of 800 to 1200 and a degree of acetalization of at least 60%, said phenol-formaldehyde resin constituting at least 20 percent and up to about 70 percent by weight of the total resin in said coating, said polyvinyl alcohol solution thereby forming a liquid film upon the coated metal casting surface, whereby upon evaporation of the solvent from said solution a solid polyvinyl alcohol film is deposited upon said coated casting surface, said film being readily stripped therefrom but said coating remaining adherent to said metal film-casting surface upon stripping of said polyvinyl alcohol film.

2. The method of forming a film of polyvinyl alcohol from an aqueous polyvinyl alcohol solution which comprises depositing said solution upon a rotatable film-casting surface coated with a coating consisting essentially of a phenol-formaldehyde resin and a polyvinyl butyral resin having a degree of polymerization of 800 to 1200 and a degree of acetalization of at least 60%, said phenol-formaldehyde resin constituting at least 20 percent and up to about 70 percent by weight of the total resin in said coating, said coating being formed by coating said metal surface with a solution of said phenyl formaldehyde resin and said polyvinyl butyral resin, drying the resultant coating to evaporate the solvent from the resin solution, and heat treating the dried coating for 1 to 15 hours at a temperature of from 100 to 200° C. to insolubilize the coating and improve the durability of said coating, said polyvinyl alcohol solution thereby forming a liquid film upon the coated metal casting surface, whereby upon evaporation of the solvent from said solution a solid polyvinyl alcohol film is deposited upon said coated casting surface, said film being readily stripped therefrom but said coating remaining adherent to said metal film-casting surface upon stripping of said polyvinyl alcohol film.

References Cited by the Examiner

UNITED STATES PATENTS

| | | | |
|---|---|---|---|
| 1,981,472 | 11/1934 | Schneider | 18—15 |
| 2,307,588 | 1/1943 | Jackson et al. | 117—232 |
| 2,327,765 | 8/1943 | Carver | 264—213 |
| 2,964,491 | 12/1960 | Rylander | 117—132 |

FOREIGN PATENTS

| | | |
|---|---|---|
| 566,144 | 12/1944 | Great Britain. |
| 595,567 | 12/1947 | Great Britain. |

ALFRED L. LEAVITT, *Primary Examiner.*

ALEXANDER H. BRODMERKEL, ROBERT F. WHITE, *Examiners.*